US009819476B2

(12) United States Patent
Aggarwal et al.

(10) Patent No.: US 9,819,476 B2
(45) Date of Patent: *Nov. 14, 2017

(54) SYSTEM AND METHOD FOR FULL-DUPLEX MAC TIMING MODIFICATIONS

(71) Applicant: AT&T Intellectual Property I, L.P., Atlanta, GA (US)

(72) Inventors: Vaneet Aggarwal, Parsippany, NJ (US); Rittwik Jana, Parsippany, NJ (US); Christopher W. Rice, Parsippany, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,468

(22) Filed: Jan. 19, 2017

(65) Prior Publication Data
US 2017/0134151 A1    May 11, 2017

Related U.S. Application Data

(63) Continuation of application No. 15/049,560, filed on Feb. 22, 2016, now Pat. No. 9,553,958, which is a
(Continued)

(51) Int. Cl.
*H04B 7/005*    (2006.01)
*H04L 5/14*    (2006.01)
(Continued)

(52) U.S. Cl.
CPC .......... *H04L 5/14* (2013.01); *H04W 72/0446* (2013.01); *H04W 74/08* (2013.01); *H04W 84/12* (2013.01)

(58) Field of Classification Search
CPC ................. H04L 5/14; H04W 72/00
(Continued)

(56) References Cited

U.S. PATENT DOCUMENTS 7,817,641 B1    10/2010    Khandani
8,554,237 B2 *  10/2013    Medepalli ........... H04W 72/085
                                                        455/450

(Continued)

OTHER PUBLICATIONS

S. Chen, M.A. Beach, and J.P. McGeehan. Division-free duplex for wireless applications. *Electronics Letters*, 34(2): 147-148, Jan. 1998.
(Continued)

*Primary Examiner* — Iqbal Zaidi

(57) ABSTRACT

A system, method, and computer-readable storage media for reducing monopolization of a frequency channel during full-duplex communications. The MAC layer of governing communications can be modified to reduce likelihood of monopolization by (1) in networks which are exclusively filled with full-duplex devices, configuring non-communicating devices to ignore data collisions of communicating devices, requiring the communicating devices to wait for an standard backoff time after the data transmission is complete; and/or (2) in mixed half-duplex/full-duplex networks, requiring a half-duplex nodes and/or a full-duplex node to wait an extended duration after the data transmission is complete, while the non-communicating devices do not wait an extended duration.

20 Claims, 7 Drawing Sheets

Related U.S. Application Data continuation of application No. 13/720,057, filed on Dec. 19, 2012, now Pat. No. 9,271,307.

(51) Int. Cl.
  *H04W 74/08* (2009.01)
  *H04W 72/04* (2009.01)
  *H04W 84/12* (2009.01)

(58) Field of Classification Search
  USPC .................. 370/278, 328–339; 455/450–453
  See application file for complete search history.

(56) References Cited

U.S. PATENT DOCUMENTS

2008/0240078 A1   10/2008   Thubert et al.
2009/0103485 A1   4/2009   Singh et al.

OTHER PUBLICATIONS

D.W. Bliss, P. Parker, and A.R. Margetts. Simultaneous transmission and reception for improved wireless network performance. In *Proc. of IEEE/SP 14th Workshop on Statistical Signal Processing*, pp. 478-482, Aug. 2007.

B. Radunovic, D. Gunawardena, P. Key, A.P.N. Singh, V. Balan, and G. Dejean. Rethinking indoor wireless: Low power, low frequency, full duplex. Technical report, Microsoft Technical Report, 2009.

J. Choi, M. Jain, K. Srinivasan, P. Levis, and S. Katti. Achieving single channel, full duplex wireless communication. In *Proc. of the ACM Mobicom*, Illinois, USA, 2010. ACM New York, NY, USA.

M. Duarte and A. Sabharwal. Full-duplex wireless communications using off-the-shelf radios: Feasibilty and first results. In *Proc. of Asilomar Conference on Signals, Systems and Computers*, Monterey, CA, 2010.

M. Jain, J. Choi, T.M. Kim, D. Bharadia, S. Seth, K. Srinivasan, P. Levis, S. Katti, and P. Sinha. Practical, Real-time Full Duplex wireless. In *Proc. of the ACM Mobicom*, Illinois, USA, 2011. Acm New York, NY, USA.

A. Sahai, G. Patel, and A. Sabharwal. Pushing the limits of Full-duplex: Design and Real-time implementation. In arXiv.org:1107.0607, 2011.

A. Sahai, G. Patel, and A. Sabharwal. Asynchronous Full-duplex Wireless. In *Proc.of IEEE COMSNETS*, Bangalore, India, 2012.

M.A. Khojastepour, K. Sundaresan, S. Rangarajan, X. Zhang, and S. Barghi. The case for antenna cancellation for scalable full duplex wireless communications. In *Proc. of Hotnets*, Nov. 2011.

E. Aryafar, M.A. Khojastepour, K. Sundaresan, S. Rangarajan, and M. Chiang. Midu: Enabling mimo full duplex. In *Proc. of the ACM Mobicom*, 2012.

W. Kim, H. Lee, M. Kim, and H.K. Chung. Distribution of eigenvalues for 2x2 mimo channel capacity based on indoor measurements. *IEEE Transactions on Wireless Communications*, 11(4): 1255-1259, Apr. 2012.

SMA attenuator. Pasternack Enterprises Data Sheet.

SMA female power divider PE2014. Pasternack Enterprises Data Sheet.

Wireless Open-Access Research Platform (WARP). http://www.rice.edu/trac.

S.M. Alamouti. A simple transmit diversity technique for wireless communications. *IEEE Journal on Selected Areas in Communications*, 16(8):1451-1458, Oct. 1998.

MIMO. www.mathworks.com, Communications System Toolbox R2011b.

L-com Antennas. http://www.l-com.com, 2.4 GHz 7 dBi Desktop Omni Antenna Spec.

Melissa Duarte. *Full-duplex Wireless: Design, Implementation and Characterization*. PhD thesis, Rice University, 2012.

T. Riihonen, S. Werner, and R. Wichman. Mitigation of loopback self-interference in full-duplex MIMO relays. *IEEE Transactions on Signal Processing*, 59(12):5983-5993, Dec. 2011.

M. Duarte, C. Dick, and A. Sabharwal. Experiment-driven characterization of full-duplex wireless systems. *IEEE Transactions on Wireless Communications Accepted for Publication*, Available at http://arxiv.org/abs/1107.1276 2012.

David Tse and Pramod Viswanath. *Fundamentals of Wireless Communications*. Cambridge University Press, 2005.

J. Geier. 802.11 Medium Access Methods, Nov. 2002. http://www.wi-fiplanet.comitutorials/article.php/1548381.

J.G. Proakis. *Digital Communications*. McGraw-Hill, 1983. Book.

IEEE-802.11. IEEE Std 802.11-2007 and IEEE Std 802.11n-2009.

N. Singh, D. Gunawardena, A. Proutiere, B. Radunovic, H.V. Balan, and P. Key. Efficient and Fair MAC for wireless networks with self interference cancellation. In *Proceedings of WiOpt*, Princeton, NJ, 2011.

E. Everett, M. Duarte, C. Dick, and A. Sabharwal. Empowering full-duplex wireless communication by exploiting directional diversity. In *IEEE Asilomar Conference on Signals, Systems and Computers*, 2011.

Melissa Durate, "Design and Characterization of a Full-Duplex Multi-Antenna System for WiFi networks", Oct. 8, 2012.

\* cited by examiner

SYSTEM AND METHOD FOR FULL-DUPLEX MAC TIMING MODIFICATIONS

PRIORITY INFORMATION

The present application is a continuation of U.S. patent application Ser. No. 15/049,560, filed Feb. 22, 2016, which is a continuation of U.S. patent application Ser. No. 13/720,057, filed Dec. 19, 2012, now U.S. Pat. No. 9,271,307 issued on Feb. 23, 2016, the contents of which are incorporated herein by reference in their entirety.

BACKGROUND

1. Technical Field

The present disclosure relates to full-duplex media access control (MAC) timing modification, and more specifically to ensuring that node pairs involved in full-duplex communications do not receive an unfair advantage of capturing the full-duplex channel repeatedly over nodes communicating in a half-duplex mode.

2. Introduction

In 802.11 wireless networks, various durations for specific actions and events are defined. The durations often change depending on protocol version (for example, version 802.11(a) versus version 802.11(n)), however the relationships of the defined durations do not change. Examples of durations defined within the 802.11 model are SIFS (short interframe space), DIFS (distributed coordination function interframe space), and EIFS (extended interframe space). The relationships of the exemplary durations, as defined by the 802.11 model, are that a SIFS has a shorter duration than a DIFS, which in turn has a shorter duration than an EIFS. For example, the SIFS can have a duration of 10 μs, the DIFS can have a duration of the SIFS duration+(2×a predetermined slot time), and the EIFS can have a duration of the SIFS duration+the DIFS duration+acknowledgment duration. Alternatively, the SIFS can have a duration determined based on transmission and processing delays built into the system.

A MAC (media access control) layer defines how nodes communicate with other nodes using a specific protocol version. MAC layers for the 802.11 model and other wireless networks specify that nodes will pause for a longer wait time (EIFS), rather than the standard wait time (DIFS), when the nodes receive an erroneous packet. The purpose of the extended wait time upon receiving an erroneous packet is to allow other packet recipient nodes, who received the data correctly, to be able to send an acknowledgment frame in time.

DETAILED DESCRIPTION

The following disclosure covers two general embodiments that relate to how nodes in a network communication. A first embodiment relates to nodes communicating in a full-duplex mode. A second embodiment focuses on a scenario where a half-duplex node is communicating in a network where other full-duplex nodes are involved in full-duplex communication. In the second embodiment, the half-duplex node ignores what it would normally view as collisions with respect to how it handles the interface spacing. Knowledge about the other nodes being in full-duplex communication can be explicitly communicated or inferred by the half-duplex node.

As noted above, the first embodiment covers full-duplex communication between two nodes. A system, method, computer-readable media, and a computer-readable device reduce the likelihood of monopolization of a frequency channel by full-duplex devices by modifying the MAC layer. In a network where all nodes are configured to be full-duplex capable, the MAC can be modified such that upon termination of the communication between the full-duplex devices, the devices which just finished communicating defer (wait) for an EIFS duration prior to engaging in the next contention round. The other nodes in the network, which were not communicating and which viewed the full-duplex data as collisions, similarly pause for an EIFS. Because all of the nodes in the network pause for an EIFS, the likelihood of channel monopolization by the two communicating full-duplex nodes is reduced.

Figure 2:
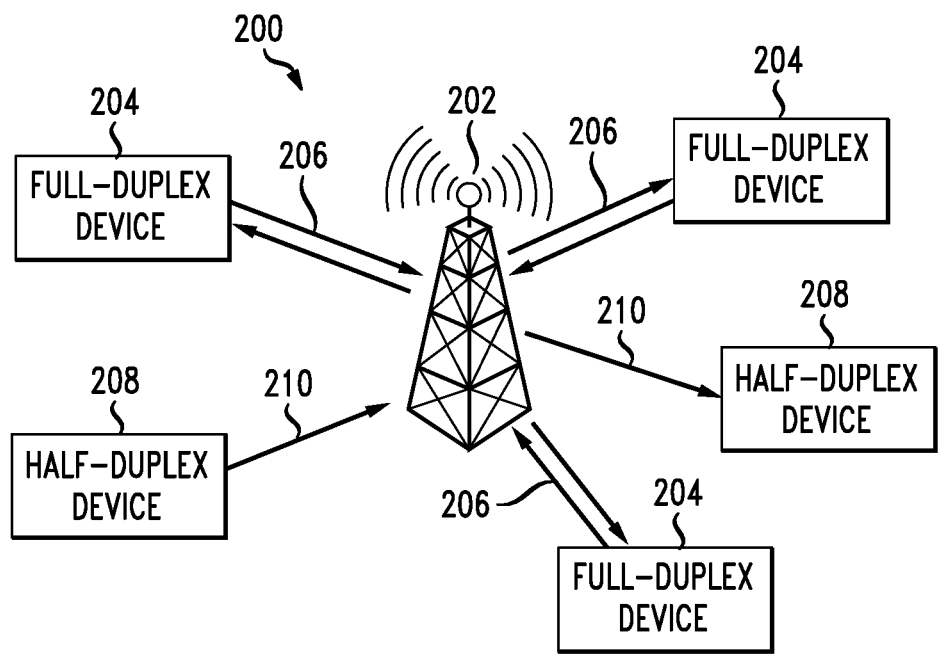
FIG. 2 illustrates an exemplary network having both half-duplex and full-duplex devices.

When full-duplex capable nodes are introduced to a network, data can be transmitted by two separate nodes simultaneously in a single frequency channel. For example, as illustrated in FIG. 2, a network 200 which contains half-duplex devices 208 (which are only capable of half-duplex communications 210, or are only communicating in a half-duplex mode) has full-duplex devices 204 (which are capable of full-duplex communications 206) introduced into the network 200. The half-duplex devices 208 and the full-duplex devices 204 all communicate with an access point 202, which can be a router, base station, or other centralized communication node, or with another wireless device (not illustrated). The network 200 as illustrated can provide increased communications efficiency, throughput, and/or bandwidth, while allowing for both full-duplex and half-duplex nodes. However, while full-duplex communications can be beneficial to a network, current MAC layer designs specify that when multiple packets are received on a single frequency channel from multiple sources, a collision or error has occurred. Therefore, while the full-duplex capable nodes communicating will not detect any errors and will, following communication, back off for the standard DIFS time period, the remaining nodes in the network will see an error and backoff for an extended EIFS time period. After waiting for the standard DIFS time period, the nodes which had been communicating can begin contending for the next round of communications, while the remaining nodes wait for the EIFS period before beginning contention. Because the DIFS wait time is smaller than the EIFS wait time, there is a higher likelihood that one of the full-duplex nodes which had been communicating will grab the channel again, producing additional interference, and unfairly monopolizing the frequency channel.

Figure 3:
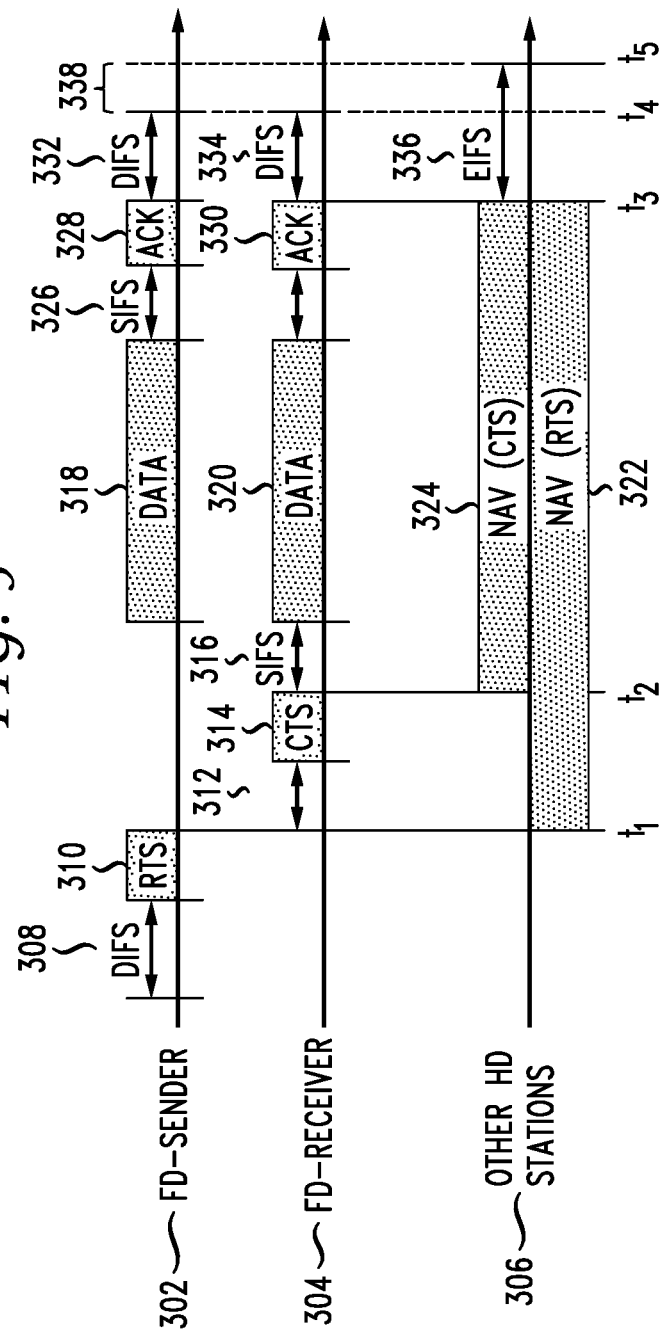
FIG. 3 illustrates an example of potential frequency channel monopolization using MAC frames associated with 802.11(a)

FIG. 3 illustrates the potential for nodes to monopolize the frequency channel. A full-duplex sender 302 and full-duplex receiver 304 have won a contention round, allowing them access to the frequency channel. After waiting a DIFS period of time 308, the sender 302 sends a request-to-send signal 310, indicating that the node 302 is ready to transmit data. After a SIFS (short interframe space) 312, the receiving node sends a clear-to-send 314, indicating both that the sender node 302 can send data and also that the receiver node 304 has data it will be transmitting in the same frequency channel, creating a full-duplex communication. After another SIFS 316, both nodes 302, 304 initiate communication of the data 318, 320. Upon completing the data transmission, the nodes 302, 304 pause for another SIFS 326, and transmit acknowledgments 328, 330 if the data 318, 320 was received correctly. Assuming the data was received correctly, the sender 302 and receiver 304 both wait for a standard DIFS 332, 334 period of time before initiating the next round of communications.

However, the other nodes 306 in the network, which are either not full-duplex capable or are configured using non-full-duplex MAC layers, see the full-duplex communications as errors. For example, other nodes 306 receive, during the RTS-CTS handshake 310, 314, network allocation vectors (NAVs) 322, 324 indicating the estimated packet sizes the sender 302 and receiver 304 will be communicating. However, upon the full-duplex communications beginning with the transmissions of data 318, 320, the other nodes 306 receive packets intended for two distinct nodes 302, 304, and determine that an error has occurred. Therefore, at time $t_3$, when the sender 302 and receiver 304, have finished communications and begin waiting the standard DIFS 332, 334, which will end at time $t_4$. The other nodes 306 begin, at time $t_3$, to wait for the extended EIFS 336, which will end at time $t_5$. The gap 338 between when the DIFS ends at time $t_4$ and when the EIFS ends at time $t_5$ can produce unfairness in capturing the channel, because the nodes which wait for the DIFS time period can re-capture the channel, never providing the other nodes 306 the opportunity to communicate data. In a network that has both full-duplex and half-duplex nodes, the MAC layer is modified such that the nodes which were transmitting in full-duplex wait, upon completing transmission, for an EIFS duration of time, whereas the other nodes which were detecting "collisions" either immediately begin contending for the next communication round, or alternatively, wait for a DIFS duration before beginning the contention round.

These and other various embodiments are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of modifications to the MAC layers to prevent unfairness, as well as various embodiments and configurations, will then follow. These variations shall be described herein as the various embodiments are set forth. The disclosure now turns to FIG. 1.

Figure 1:
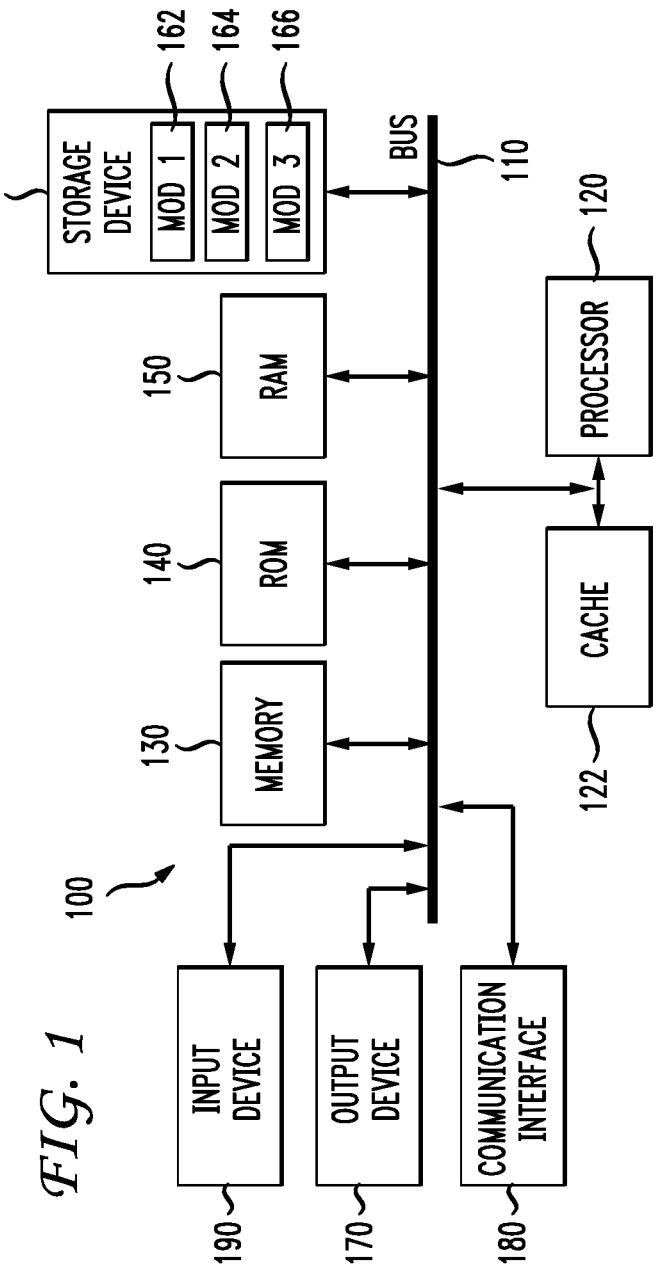
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium, or in a computer-readable storage device, in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, or computer-readable storage devices, expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 4:
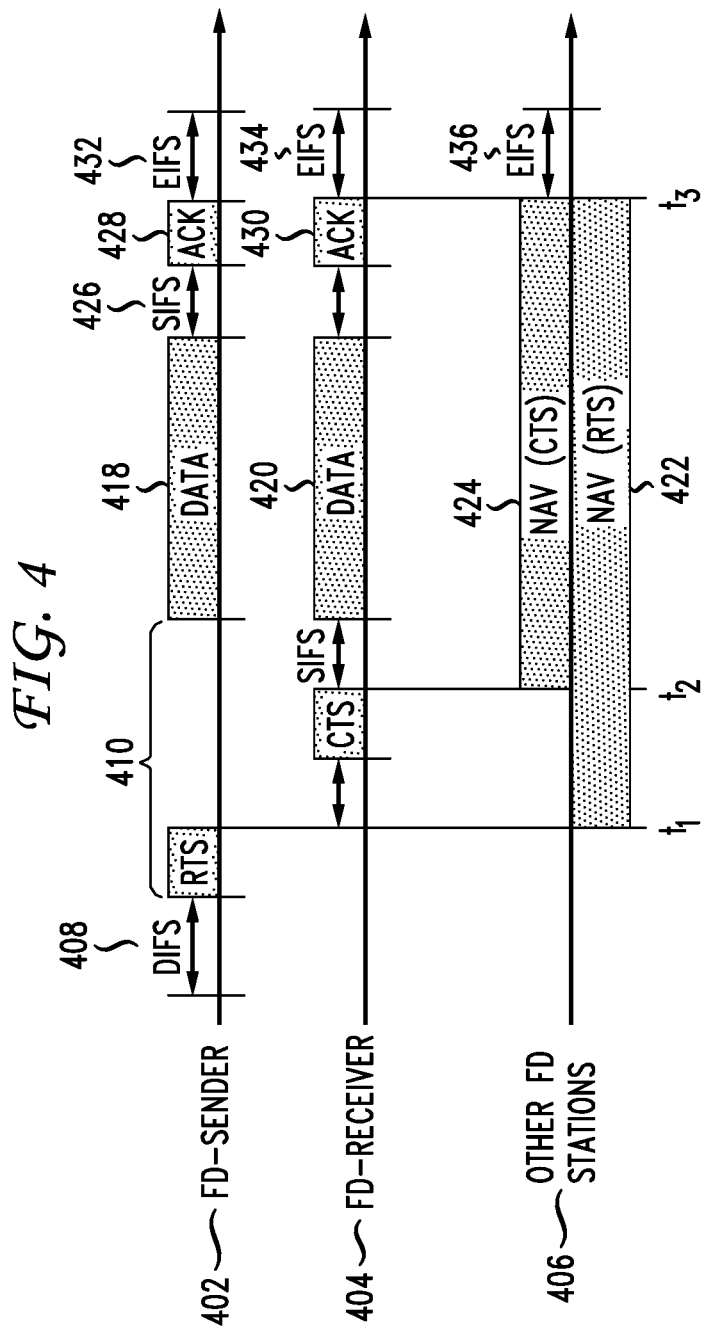
FIG. 4 illustrates an example of MAC frames according to a first embodiment.

Having disclosed some components of a computing system, and having discussed FIGS. 2 and 3 above, the disclosure provides exemplary embodiments. While these embodiments are discussed separately, elements and pieces of each embodiment can be combined without violation of the principles disclosed herein. FIG. 4 illustrates an example of MAC frames according to a first embodiment. A full-duplex sender 402 has won a contention round with a full-duplex sender 404. After waiting for a DIFS duration 408, the sender 402 and receiver engage in a RTS-CTS handshake 410 prior to initiate communication of data. Other full-duplex nodes 406 recognize the signals exchanged in the RTS-CTS handshake, and recognize the NAV durations 422, 424 indicated within the RTS and CTS signals.

As the sender 402 and receiver 404 exchange data 418, 420 in full-duplex, the other nodes 406 receive two sets of data packets, which is recorded as a collision per previous MAC layer designs. Upon finishing the data transmissions 418, 420, the sender 402 and receiver 404 pause for a SIFS duration 426, and transmit acknowledgements of the data received 428, 430. Following the transmission of acknowledgments, at time $t_3$, the sender 402 and receiver 404 pause an EIFS duration 432, 434 prior to entering a new contention round. The other full-duplex nodes 406, which have been recording collisions during the process, recognize the end of the data exchange, at time $t_3$, and also wait for an EIFS 436. Recognition of the end of the data exchange can occur based on receiving the transmitted acknowledgments 428, 430, or based on the termination of the NAV durations 422, 424 previously received.

In other configurations the other nodes 406 can be half-duplex nodes, or alternatively, a mixture of full-duplex and half-duplex nodes. In addition, the MAC can be modified such that the other nodes 406 wait for a shorter duration than an EIFS, such as a DIFS, an SIFS, or for as short a duration as logistically possible, prior to initiating the next contention round. Because the sender 402 and receiver 404 nodes are configured to wait for an EIFS, these shorter durations can provide an advantage to the other nodes 406 in "winning" the contention round.

Figure 5:
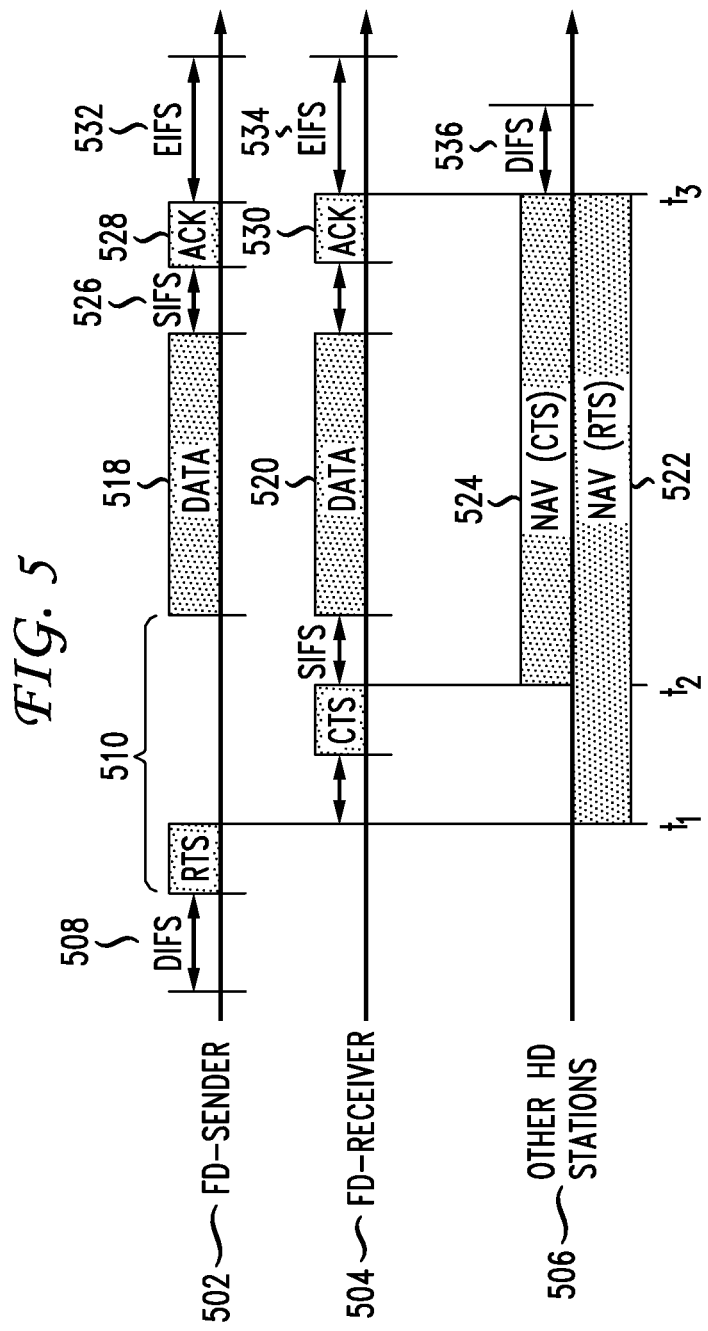
FIG. 5 illustrates an example of MAC frames according to a second embodiment.

The second embodiment disclosed herein covers a configuration where a half-duplex node is communicating in a network where at least one other node is communicating in a full duplex mode. FIG. 5 illustrates an example of MAC frames according to the second embodiment. A full-duplex sender 502 has won a contention round for access to a full-duplex receiver 504. After waiting for a DIFS duration 508, the sender 502 and receiver 504 engage in a RTS-CTS handshake 510 prior to initiate communication of data. Other half-duplex nodes 506 recognize the signals exchanged in the RTS-CTS handshake, and recognize the NAV durations 522, 524 indicated within the RTS and CTS signals. As the sender 502 and receiver 504 exchange data 518, 520 in full-duplex, the other half-duplex nodes 506 receive two sets of data packets, which are considered collisions, just as previous MAC layer designs have specified. Alternatively, the other half-duplex nodes 506 (and/or additional full-duplex nodes in the network) can ignore the collisions, rather than recording the collisions, until the end of the NAV durations received. The information about the full-duplex transfer can be inferred by a half-duplex node in some fashion. One example of how the half-duplex node would infer data about a full-duplex transfer via another node is through information in the CTS packet or through other data. Further, other full-duplex capable nodes and/or full-duplex nodes in a full-duplex communication mode may also have explicit information about or inferred information about a set of nodes in full-duplex communication such that the other full-duplex capable node and/or full-duplex nodes in a full-duplex communication mode also ignore collisions in the NAV duration from the set of nodes in full-duplex communication.

Upon finishing the data transmissions 518, 520, the sender 502 and receiver 504 pause for a SIFS duration 526, and transmit acknowledgements of the data received 528, 530. Following the transmission of acknowledgments 528, 530, at time $t_3$, the sender 502 and receiver 504 pause an EIFS duration 532, 534 prior to entering a new contention round. The other half-duplex nodes 506, which have been registering collisions during the full-duplex exchange process or ignoring the collisions, recognize the end of the data exchange. The recognition can occur based on receiving the acknowledgments 528, 530 transmitted, or based on the termination of the NAV durations 522, 524 previously received. At time $t_3$, upon recognizing that the data exchange has ended, the other half-duplex nodes 506 do not wait for an EIFS, but instead wait for a DIFS duration 536. After the DIFS duration 536, the other half-duplex nodes 506 can immediately initiate a new contention round, decreasing the likelihood of the nodes which sent and received data 502, 504 in the previous round re-winning the contention round. In certain configurations, at time $t_3$ the other half-duplex nodes 506 do not wait for a DIFS or an EIFS, instead immediately initiating the new contention round.

Figure 6:
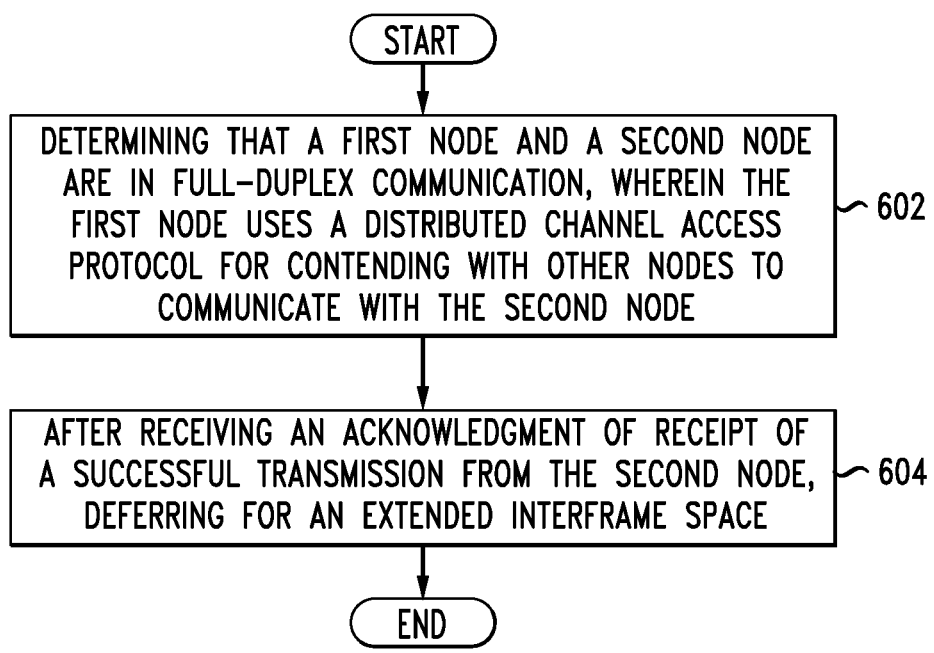
FIG. 6 illustrates a first example method embodiment.

Having disclosed some basic system components and concepts, the disclosure now turns to the first exemplary method embodiment shown in FIG. 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 first determines that a first node and a second node are in full-duplex communication, wherein the first node uses a distributed channel access protocol for contending with other nodes to communicate with the second node (602). For example, the first node uses the distributed channel access protocol to win a contention round. Winning the contention round can be based on strength of signal, priority of data, time since last communication, or other factors having a relative weight higher than factors belonging to other nodes. The system 100, for example, can be the first node or the second node.

Examples of the first node and second node can be wireless devices, such as smartphones, tablet computers, laptops, and wireless routers. Therefore, if the system 100, acting as the first node, is a smartphone and the second node is a wireless router, per step 602 the system 100 wins the contention round using a distributed channel access protocol and begins full-duplex communications with the router.

After receiving an acknowledgment of receipt of a successful transmission from the second node, the system 100 defers, or waits, for an extended interframe space (604). The extended interframe space is longer than the standard distributed coordination function interframe space, or DCF interframe space, between rounds of communication. For example, the DCF interframe space could have a duration of 50 μs, whereas the extended interframe space is longer than 50 μs. In certain configurations, the system 100 can receive instructions directing it to wait for the extended interframe space based on the other nodes, whereas in other configurations the MAC layer associated with the system 100 can be permanently modified such that communications the system 100 always defers, after receiving acknowledgment of receipt of data, for an extended interframe space. As an example of a signal that could be used to indicate that an extended interframe space duration should follow, a CTS sender can indicate that it intends to send full-duplex data by re-purposing an unused bit (e.g., the More Data bit in the CTS Frame Control field). The unused bit can indicate that the modified version of the MAC should be used. Another option is for a full-duplex node to use two MAC addresses, one for half-duplex use, and the other for full-duplex use. Having two MAC addresses would allow the RTS sender to adapt its rate based on which MAC address, the full-duplex or half-duplex, is being used, and the new duration using that adapted rate could be set as a NAV duration by the CTS sender.

The other nodes associated with the system 100, which did not win the contention round, can be configured to immediate begin contending for the next round of communications, or can be configured to wait for a DIFS, an EIFS, or another time duration. The interframe spacing durations, such as DIFS, EIFS, or SIFS, used by the system 100 can be set by a standard or model, such as the 802.11 standard.

Figure 7:
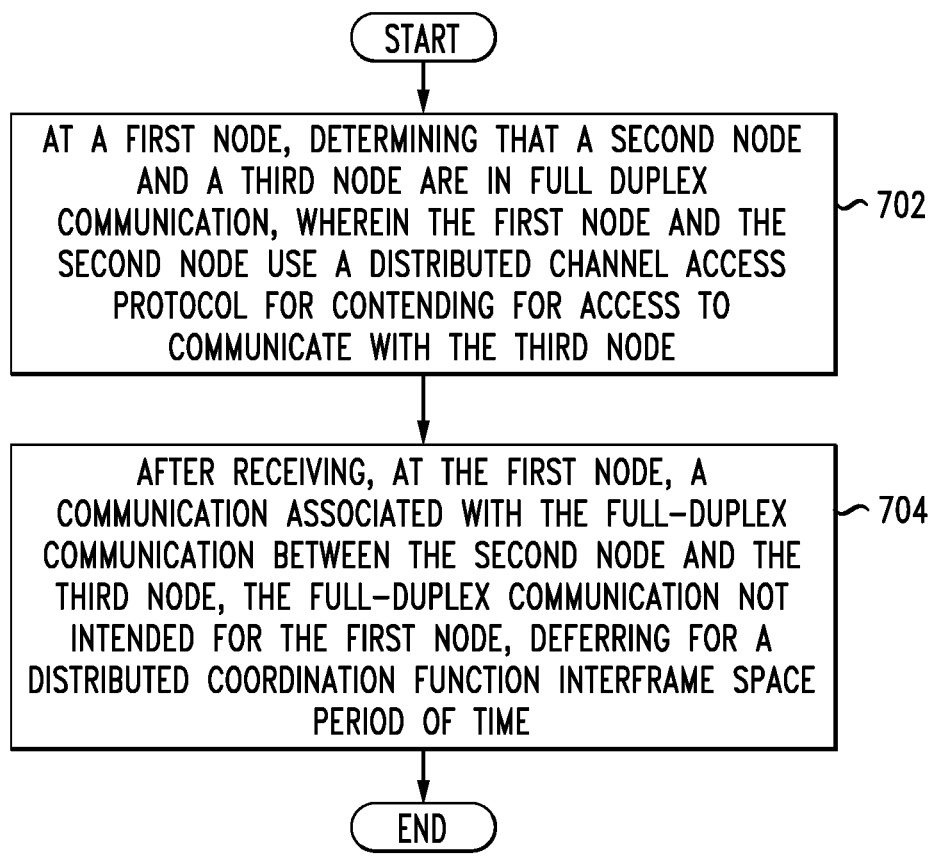
FIG. 7 illustrates a second example method embodiment.

FIG. 7 illustrates a second exemplary method embodiment. As with FIG. 6, for the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100, at a first node, determines that a second node and a third node are in full duplex communication, wherein the first node and the second node use a distributed channel access protocol for contending for access to communicate with the third node (702). The nodes can be laptops, smartphones, tablets, base stations, or other wireless devices. Contending for access can take place via a contention round, in which all of the nodes contend for the ability to communicate data with the third node.

After receiving, at the first node, a communication associated with the full-duplex communication between the second node and the third node, the full-duplex communication not intended for the first node, the system 100 defers for a distributed coordination function interframe space period of time (704). In order for the system 100 to defer for a distributed coordination function interframe space duration, the MAC layer of the system 100 can be modified. An exemplary modification can require the distributed coordination function interframe space duration to always be initiated following the reception of non-intended data, or, in other configurations, the signal can indicate that the distributed coordination function interframe space duration should be used.

As an example of a signal that could be used to indicate that a distributed coordination function interframe space duration should follow a communication, a CTS sender can indicate that it intends to send full-duplex data by re-purposing an unused bit (e.g., the More Data bit in the CTS Frame Control field). The unused bit can indicate that the modified version of the MAC should be used. Another option is for a full-duplex node to use two MAC addresses, one for half-duplex use, and the other for full-duplex use. Having two MAC addresses would allow the RTS sender to adapt its rate based on which MAC address, the full-duplex or half-duplex, is being used, and the new duration using that adapted rate could be set as a NAV duration by the CTS sender.

The system 100 can, following the distributed coordination function interframe space duration, enter a new contention round. While the first node defers for a distributed coordination function interframe space period of time, the second and third nodes can be configured to wait for an extended interframe space duration following a communication. The system 100 can initiate the subsequent contention round prior to the second node and the third node completing the extended interframe space "pause," and thereby prevents unfair monopolization of the frequency channel (used in full-duplex communications) by the second and third nodes. The interframe spacing durations, such as DIFS, EIFS, or SIFS, used by the system 100 can be set by a standard or model, such as the 802.11 standard.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to wireless communications and cellular communications where practical. Various modifications and changes may be made to the principles described herein without following the example embodiments and applications illustrated and described herein, and without departing from the spirit and scope of the disclosure.

We claim:

1. A method comprising:
   determining, at a first node, that an extended interframe space should be used rather than a distributed coordination function interframe space after a current data communication round between the first node and a second node that are in full-duplex communication; and
   after receiving an acknowledgment of receipt of a successful transmission from the second node as part of the current data communication round, deferring contention in a distributed channel access protocol at the first node for the extended interframe space, wherein the extended interframe space delays the first node from entering a subsequent contention round with the second node relative to when the first node would enter the subsequent contention round under the distributed coordination function interframe space.

2. The method of claim 1, wherein the first node uses a distributed channel access protocol for contending with other nodes to communicate with the second node.

3. The method of claim 1, wherein the extended interframe space delays the first node from entering a subsequent contention round based on a start time.

4. The method of claim 1, further comprising:
   determining that the first node is in full-duplex communication based on transmission and reception of data occurring simultaneously to and from the first node on a single frequency channel.

5. The method of claim 1, wherein the first node is one of a smartphone, a laptop, a router, and a computer.

6. The method of claim 1, wherein a duration of the extended interframe space is defined by an 802.11 standard.

7. The method of claim 1, wherein the first node does not transmit data in a subsequent full-duplex communication round.

8. A system comprising:
   a processor; and
   a computer-readable storage medium having instructions stored which, when executed by the processor, cause the processor to perform operations comprising:
      determining, at the system, that an extended interframe space should be used rather than a distributed coordination function interframe space after a current data communication round between the system and a communication node that are in a full-duplex communication; and
      after receiving an acknowledgment of receipt of a successful transmission from the communication node as part of the current data communication round, deferring contention in a distributed channel access protocol at the system for the extended interframe space, wherein the extended interframe space delays the system from entering a subsequent contention round with the communication node relative to when the system would enter the subsequent contention round under the distributed coordination function interframe space.

9. The system of claim 8, wherein the system uses a distributed channel access protocol for contending with other nodes to communicate with the communication node.

10. The system of claim 8, wherein the extended interframe space delays the system from entering a subsequent contention round based on a start time.

11. The system of claim 8, wherein the computer-readable storage medium has additional instructions stored which, when executed by the processor, cause the processor to perform operation of determining that the system is in full-duplex communication based on transmission and reception of data occurring simultaneously to and from the system node on a single frequency channel.

12. The system of claim 8, wherein the system is one of a smartphone, a laptop, a router, and a computer.

13. The system of claim 8, wherein a duration of the extended interframe space is defined by an 802.11 standard.

14. The system of claim 8, wherein the system does not transmit data in a subsequent full-duplex communication round.

15. A computer-readable storage device having instructions stored which, when executed by a computing device, cause the computing device to perform operations comprising:
  determining, at a first node, that an extended interframe space should be used rather than a distributed coordination function interframe space after a current data communication round between the first node and a second node that are in full-duplex communication; and
  after receiving an acknowledgment of receipt of a successful transmission from the second node as part of the current data communication round, deferring contention in a distributed channel access protocol at the first node for the extended interframe space, wherein the extended interframe space delays the first node from entering a subsequent contention round with the second node relative to when the first node would enter the subsequent contention round under the distributed coordination function interframe space.

16. The computer-readable storage device of claim 15, wherein the first node uses a distributed channel access protocol for contending with other nodes to communicate with the second node.

17. The computer-readable storage device of claim 15, wherein the extended interframe space delays the first node from entering a subsequent contention round based on a start time.

18. The computer-readable storage device of claim 15, wherein the computer-readable storage device stores additional instructions stored which, when executed by the computing device, cause the computing device to perform further operations comprising:
  determining that the first node is in full-duplex communication based on transmission and reception of data occurring simultaneously to and from the first node on a single frequency channel.

19. The computer-readable storage device of claim 15, wherein the first node is one of a smartphone, a laptop, a router, and a computer.

20. The computer-readable storage device of claim 15, wherein a duration of the extended interframe space is defined by an 802.11 standard.

* * * * *